(12) United States Patent
Haepp et al.

(10) Patent No.: US 9,440,489 B2
(45) Date of Patent: Sep. 13, 2016

(54) CASSETTE SEAL, PARTICULARLY FOR A WHEEL BEARING ARRANGEMENT OF A MOTOR VEHICLE

(71) Applicant: Schaeffler Technologies GmbH & Co. KG, Herzogenaurach (DE)

(72) Inventors: Alexander Haepp, Hofheim (DE); Wilhelm Walter, Dittelbrunn (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/381,737

(22) PCT Filed: Jan. 17, 2013

(86) PCT No.: PCT/EP2013/050821
§ 371 (c)(1),
(2) Date: Aug. 28, 2014

(87) PCT Pub. No.: WO2013/139495
PCT Pub. Date: Sep. 26, 2013

(65) Prior Publication Data
US 2015/0014935 A1    Jan. 15, 2015

(30) Foreign Application Priority Data
Mar. 22, 2012 (DE) ........................ 10 2012 204 620

(51) Int. Cl.
*F16J 15/32* (2016.01)
*B60B 27/00* (2006.01)
*F16J 15/16* (2006.01)
*F16C 33/78* (2006.01)
*F16C 41/00* (2006.01)
*F16C 19/18* (2006.01)
*F16C 33/80* (2006.01)

(52) U.S. Cl.
CPC ....... *B60B 27/0073* (2013.01); *B60B 27/0005* (2013.01); *B60B 27/0068* (2013.01); *F16C 33/7883* (2013.01); *F16C 41/007* (2013.01); *F16J 15/164* (2013.01); *F16J 15/326* (2013.01); *F16J 15/3264* (2013.01); *B60B 2900/5112* (2013.01); *B60B 2900/5114* (2013.01); *F16C19/184* (2013.01); *F16C 33/80* (2013.01); *F16C 2326/02* (2013.01)

(58) Field of Classification Search
CPC .... F16J 15/32; F16J 15/3232; F16J 15/3248; F16J 15/3252; F16J 32/3256; F16J 32/326; F16J 32/3264
See application file for complete search history.

(56) References Cited

U.S. PATENT DOCUMENTS

| | | | |
|---|---|---|---|
| 5,431,413 A | 7/1995 | Hajzler | |
| 6,637,754 B1 * | 10/2003 | Ohtsuki et al. | 277/549 |
| 2004/0239532 A1 * | 12/2004 | Teshima et al. | 341/15 |
| 2011/0150380 A1 * | 6/2011 | Walter et al. | 384/484 |
| 2014/0029883 A1 * | 1/2014 | Sanaka et al. | 384/486 |

FOREIGN PATENT DOCUMENTS

| | | |
|---|---|---|
| DE | 31 03 319 | 8/1982 |
| DE | 10 2008 017 409 | 10/2009 |
| DE | 10 2011 088 865 | 6/2013 |
| EP | 0942 188 | 9/1999 |
| EP | 2003352 | 12/2008 |
| JP | 2011099464 | 5/2011 |

* cited by examiner

*Primary Examiner* — Gilbert Lee
(74) *Attorney, Agent, or Firm* — Davidson, Davidson & Kappel, LLC

(57) ABSTRACT

A cassette seal includes a first and a second ring, wherein the axial sections and the radial sections of the first and second ring are aligned approximately parallel to one another, forming an interior in which a sealing arrangement arranged on the first ring engages in the direction of the second ring and a gap is formed between the radial section of the first ring and the axial section of the second ring. A fixed additional element extends on the side of the axial section of the second ring facing away from the interior, and the rises in the direction of the radial section of the first ring above the axial section of the second ring with a protrusion. The protrusion has a downward slope in the direction of the second ring, to form the gap.

7 Claims, 3 Drawing Sheets

CASSETTE SEAL, PARTICULARLY FOR A WHEEL BEARING ARRANGEMENT OF A MOTOR VEHICLE

The present invention relates to a cassette seal, in particular for a wheel bearing arrangement of a motor vehicle, including a first ring and a second ring which have an approximately L-shaped cross section, the axial sections and the radial sections of the first and second rings being aligned approximately in parallel to each other, so that an inner chamber is formed, with which a sealing arrangement situated on the first ring engages in the direction of the second ring, and a gap is provided between the radial section of the first ring and the axial section of the second ring, an encoder extending on the side of the axial section of the second ring facing away from the inner chamber; the present invention also relates to a wheel bearing arrangement.

BACKGROUND

Cassette seals are used to seal a wheel bearing for a passenger car or for a truck and to protect the rolling body chamber of the wheel bearing against water, dirt and the like entering from the outside.

A cassette seal 1, which is known per se, as illustrated in FIG. 1, includes two rings 3 and 4 having an approximately L-shaped cross section, the axial sections of rings 3 and 4 as well as the radial sections of rings 3 and 4 being aligned approximately in parallel to each other. Rings 3 and 4 form an inner chamber 6. A sealing arrangement 5, whose sealing lips 5a, 5b, 5c extend in the direction of second ring 4 in inner chamber 6, is vulcanized onto first ring 3. A cylindrical encoder 7, which surrounds the free end of axial section 8, is mounted on the axial section of second ring 4. The free end of the radial section of first ring 3 thus forms a gap 9 together with the end of encoder 7 surrounding free end 8 of the axial section of second ring 4. Due to this design, specifically of the outer diameter of encoder 7, a recirculating effect of dirty water is not achieved during the rotation of encoder 7, so that the tightness of the cassette seal is insufficient, due to the geometry of gap 9.

FIG. 2 shows a cassette seal 2, which is also known, encoder 7 having a so-called twin-axis design on the end of the axial section of second ring 4, including two lips 7a, 7b pointing in the direction of the radial section of first ring 3. While this design permits a recirculation of the penetrating dirty water, due to the rotation of encoder 7, it nevertheless requires a larger radial installation space.

SUMMARY OF THE INVENTION

It is an object of the present invention to provide a cassette seal which permits an improved sealing effect without changing the installation space of the wheel bearing.

The present invention provides that the encoder extends over the axial section of the second ring in the direction of the radial section of the first ring and, in this area, has a downward slant in the direction of the second ring, the slant forming the gap with the radial section of the first ring. Due to this optimized inlet gap geometry, a recirculating effect of the dirty water is possible while retaining the dimensions of the wheel bearing. The formation of an accumulation of water may be avoided by using the centrifugal forces which occur during the rotary motion of the wheel bearing, since the accumulation of liquid is able to flow off, due to the slant. A penetration of dirt into the cassette seal system is thus reduced.

The encoder advantageously has a ring-like design, the encoder being wider than the axial section of the second ring. The slant may thus be easily implemented on one side of the encoder ring.

In one embodiment, the slant of the encoder extends into the inner chamber. Due to the fact that the slant extends over the axial section into the inner chamber between the first ring and the second ring, the gap geometry is optimized without requiring more installation space for the cassette seal and thus for the wheel bearing arrangement.

In one variant, the slant of the encoder ends with the side of the axial section of the second ring facing away from the inner chamber, the slant having an annular indentation near the axial section of the second ring. This indentation forms a collecting channel for the contaminants, which may pass over the circumference of the cassette ring via the external slant.

In one specific embodiment, the encoder has a twin-axis design in the area which extends over the axial section of the second ring, forming the annular indentation. The penetration of the contamination into the inner chamber of the cassette seal is reliably prevented via the annular indentation.

Another embodiment of the present invention relates to a cassette seal, in particular for a wheel bearing arrangement of a motor vehicle, including a first ring and a second ring which have an approximately L-shaped cross section, the axial sections and the radial sections of the first and second rings being aligned approximately in parallel to each other, so that an inner chamber is formed, with which a sealing arrangement situated on the first ring engages in the direction of the second ring, and a gap is provided between the radial section of the first ring and the axial section of the second ring, a fixedly situated additional element extending on the side of the axial section of the second ring facing away from the inner chamber, and the additional element rising in the direction of the radial section of the first ring above the axial section of the second ring with a protrusion. In a cassette seal which permits an improved sealing action, while the installation space of the wheel bearing remains unchanged, the protrusion of the additional element projecting above the axial section of the second ring has a downward slant in the direction of the second ring, the slant forming the gap with the radial section of the first ring, and the protrusion preferably being designed without a lip. The formation of an accumulation of water may be avoided by using the centrifugal forces which occur during the rotary motion of the wheel bearing, since the accumulation of liquid is able to flow off, due to the slant. A penetration of dirt into the cassette seal system is thus reduced.

The protrusion of the additional element advantageously surrounds an end of the axial section of the second ring, the slant extending into the inner chamber. Due to the fact that the slant of the protrusion extends over the axial section into the inner chamber between the first and second rings, the gap geometry is optimized without requiring more installation space for the cassette seal and thus for the wheel bearing arrangement.

In one embodiment, the slant of the protrusion of the additional element has a stepped design. Due to such a stepped design of the slant, a labyrinth-like section is formed. Due to this labyrinth configuration, the input area of the gap opens into an annular chamber leading radially to the outside, which implements the function of collecting and recirculating contaminants. The recirculation of contaminants is caused by the centrifugal forces which occur during the rotary motion of the wheel bearing.

In one variant, the slant of the protrusion of the additional element ends with the side of the axial section of the second ring facing away from the inner chamber, the slant having an annular indentation near the axial section of the second ring. This indentation forms a collecting channel for the contaminants and may pass over the circumference of the cassette ring via the external slant. A penetration of the contamination into the internal chamber of the cassette seal is thus reliably prevented.

In one refinement, the radial section of the first ring has an axial extension above the protrusion of the additional element, which preferably runs approximately on a plane with the axial section of the second ring. Due to this axial extension, the gap is opened to the outside, so that a recirculation of the dirty water situated in the gap is facilitated by the resulting funnel-shaped opening.

The additional element is advantageously designed as a seal. This seal and the sealing arrangement, which is situated on the first ring, may be made of the same material and thus be manufactured very cost-effectively.

Alternatively, the additional element is designed as an encoder. This encoder interacts with a rotational speed sensor, with the aid of which the rotational speed of the wheel may be ascertained, due to the location on the wheel bearing. Due to the location of the encoder on the cassette seal, the installation space conditions of the wheel bearing are optimally used. It is therefore unnecessary to increase the size of the installation space for the wheel bearing to situate the encoder.

The encoder is advantageously made of a sealing material containing ferromagnetic substances. A seal, which is cost-effectively vulcanized onto the second ring of the cassette seal, therefore must only be provided with corresponding ferromagnetic substances, which makes the encoder easy to manufacture.

The wheel bearing arrangement according to the present invention, in particular for a motor vehicle, includes a cassette seal according to at least one of the features described in this patent application.

BRIEF DESCRIPTION OF THE DRAWINGS

The present invention permits numerous specific embodiments. One of these specific embodiments is explained in greater detail on the basis of the figures illustrated in the drawing.

DETAILED DESCRIPTION

Figure 1:
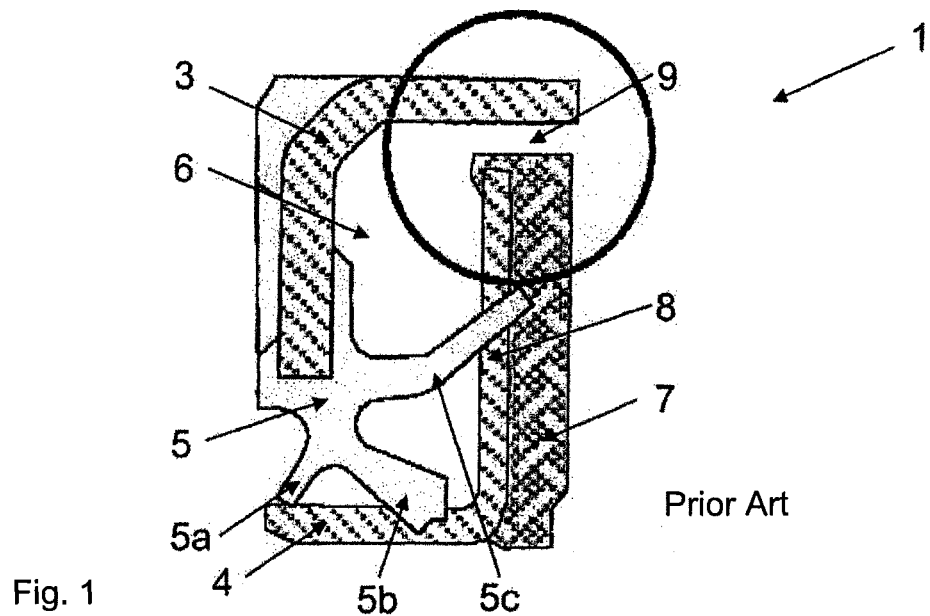
FIG. 1: shows a first cassette seal according to the prior art.
Figure 2:
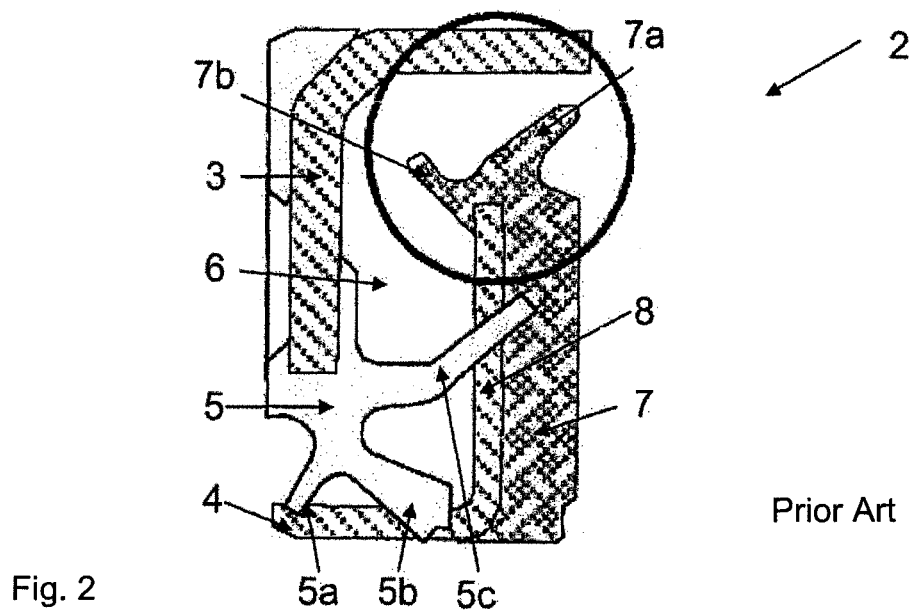
FIG. 2: shows a second cassette seal according to the prior art.

The same features are identified by the same reference numerals.

Figure 3:
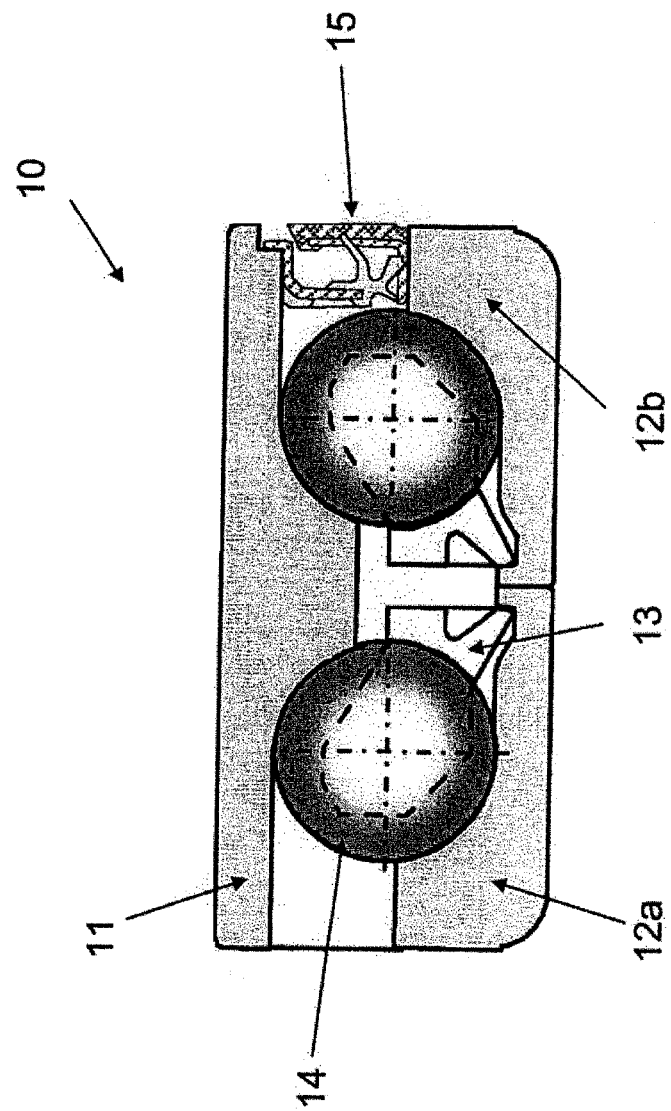
FIG. 3: shows a schematic diagram of a ball bearing for a wheel bearing arrangement having a first specific embodiment of a cassette seal according to the present invention.

FIG. 3 shows a ball bearing 10, as used in wheel bearing arrangements in motor vehicles. Ball bearing 10 includes a fixed outer ring 11 and two movable inner rings 12a, 12b which are adjacent to each other. A cage 13 is situated between outer ring 11 and inner rings 12a, 12b, which contains rolling bodies 14 which are designed as balls. Ball bearing 10 is equipped with a sealing device in the form of a cassette seal 15, which prevents water and dirt from penetrating ball bearing 10.

Various specific embodiments of the cassette seal are shown in FIGS. 4a through 4e. Cassette seal 15 illustrated in FIG. 4a corresponds to the cassette seal illustrated in FIG. 3. Cassette seal 15 in FIG. 4a includes two rings 3 and 4, which have an L-shaped cross section, axial section 3a of first ring 3 in each case being aligned in parallel to axial section 4b of second ring 4. Opposite radial section 3b of first ring 3 and radial section 4a of second ring 4, which are also situated in parallel, together with axial sections 3a and 4b of rings 3, 4, form an inner chamber 6, which is filled with a grease. Sealing lips 5a, 5b, 5c of a sealing arrangement 5, which is vulcanized onto first ring 3, project into this inner chamber 6. These sealing lips 5a, 5b and 5c extend in the direction of second ring 4 and are aligned both radially and axially. An encoder 7, which is supported by second ring 4, is situated on axial section 4b of second ring 4 on the side facing away from inner chamber 6 in the longitudinal extension thereof. Encoder 7 interacts with a sensor system, which is not illustrated in further detail, for the purpose of electronically measuring the rotational speed of a component supported by ball bearing 10. For example, the wheel rotational speed is thus ascertained in a wheel bearing arrangement. This wheel rotational speed is further processed in ABS, ASR and/or ESP applications (ABS=antilock braking system, ASR=antislip regulation system, ESP=electronic stability program).

Encoder 7 is made of a sealing material from which sealing arrangement 5 may also be made, with the difference that ferromagnetic substances are added to the sealing material of encoder 7, for which reason encoder 7 is used as a signal transmitter for the rotational speed sensor. Encoder 7 extends along and beyond axial section 4b of second ring 4 and includes a lipless protrusion 16, which has a downward slant 17 in the direction of inner chamber 6 of cassette seal 15. In the present FIG. 4a, protrusion 16 surrounds axial section 4b of second ring 4. First ring 3 has an axial extension 3c, which abuts radial section 3b of first ring 3 at a right angle, pointing away from axial section 4b of second ring 4. Extension 3c may preferably be designed as a raised flange of first ring 3, which is made of sheet metal.

Slant 17 of encoder 7 is situated approximately opposite a bend 3d between radial section 3b and axial extension 3c of ring 3 and forms gap 9 together with first ring 3. This gap 9, which acts as a throttle, prevents direct penetration of dirt by deflecting the incoming jet onto slant 17 under the dynamic conditions of the wheel bearing. Due to this deflection of the contaminants, contaminant accumulations may be avoided or transported to the outside, due to the centrifugal force which ball bearing 10 applies as a result of its rotary motion. The geometry of gap 9 is suitable, in particular for use in the area of constricted installation space conditions of a wheel bearing with a simultaneous placement of rotational speed sensors, without requiring additional installation space for providing a gap 9, which reliably causes a recirculating effect of dirty water during the rotation of encoder 7.

Figure 4:
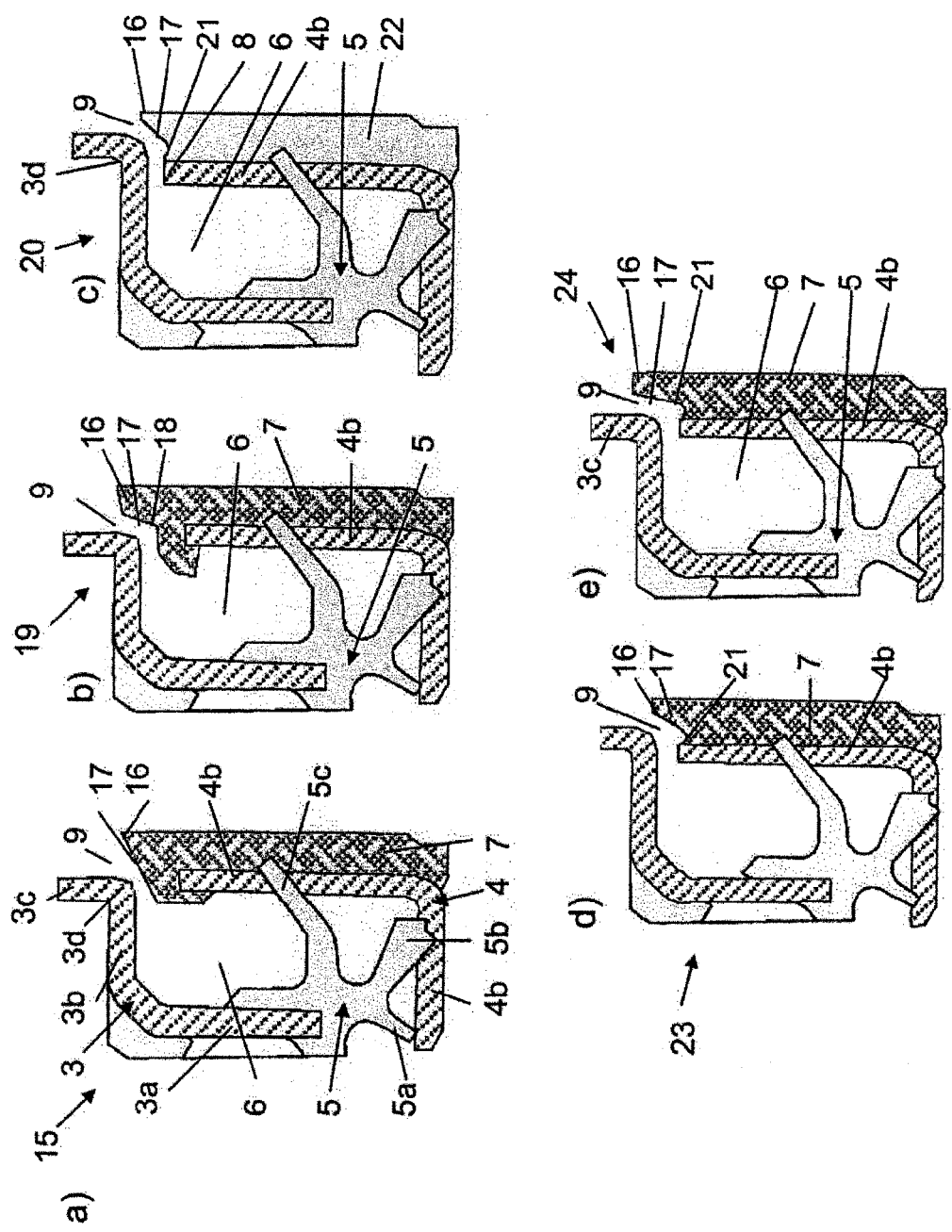
FIG. 4: shows different specific embodiments of a cassette seal according to the present invention.

Cassette seal 19 in FIG. 4b differs from FIG. 4a in that protrusion 16 of encoder 7 has a step 18. Gap 9 is thus formed in the shape of a labyrinth, which reliably prevents a penetration of dirt and contaminants into ball bearing 10. The labyrinth, which keeps the dirty water from entering inner chamber 6 of cassette seal 19, is shaped with the aid of this step 18 in such a way that multiple deflections of the entering dirty water occur, and the recirculation of the dirty water with the aid of the centrifugal forces is ensured.

FIG. 4c shows a cassette seal 20, in which axial section 4b of second ring 4 is shifted slightly with respect to axial extension 3c of first ring 3 in the direction of inner chamber 6. A seal 22, which is made of a material corresponding to the material of sealing arrangement 5, is vulcanized onto axial section 4b. Seal 22 has a protrusion 16 whose slant 17 ends before end 8 of axial section 4b of second ring 4 and has an annular groove 21 near this end 8. This annular groove 21 is approximately directly opposite bend 3d between radial section 3b and axial extension 3c of first ring 3. Annular groove 21 collects the dirty water and prevents it from penetrating inner chamber 6 of cassette seal 20. Due to this arrangement, dirt particles and liquids are reliably prevented from entering an inner area of ball bearing 10.

In cassette seal 23 illustrated in FIG. 4d, an encoder 7, which also has an annular groove 21 for collecting the dirty water, is again vulcanized onto axial section 4b of second ring 4. In this cassette seal 23, protrusion 16 of encoder 7 also extends beyond the end of axial section 4b and runs in the direction of axial extension 3c of first ring 3, which forms gap 9.

Another specific embodiment of a cassette seal 24 is illustrated in FIG. 4e, in which protrusion 16 of encoder 7 is drawn out beyond the end of axial section 4b of second ring 4 until it runs approximately in parallel to axial extension 3c of first ring 3. By drawing up protrusion 16 in this manner, gap 9 is elongated, whereby more space is available for deflecting the incoming dirty water, for the purpose of preventing it from penetrating the space between outer and inner rings 11, 12a, 12b of ball bearing 10, due to the centrifugal forces generated by the rotary motion of ball bearing 10. An overlapping of protrusion 16 of encoder 7 with end 8 of axial section 4b of second ring 4 is avoided, and annular groove 21 is used to collect the dirty water which is unable to be transported directly out of cassette seal 24 in this annular groove 21 and to recirculate it at a later point in time.

Based on the illustrated embodiment of cassette seals 15, 19, 20, 23, 24, it is possible to carry out a reliable recirculation of dirty water out of ball bearing 10 without requiring additional installation space for a cassette seal 15, 19, 20, 23, 24.

LIST OF REFERENCE NUMERALS

1 Cassette seal
2 Cassette seal
3 Ring
3a Axial section of ring 3
3b Radial section of ring 3
3c Extension of ring 3
3d Bend of ring 3
4 Ring
4a Radial section of ring 4
4b Axial section of ring 4
5 Sealing arrangement
5a Sealing lip
5b Sealing lip
5c Sealing lip
6 Inner chamber
7 Encoder
7a Lip
7b Lip
8 Free end of axial section of ring 4
9 Gap
10 Ball bearing
11 Outer ring
12a Inner ring
12b Inner ring
13 Cage
14 Rolling body
15 Cassette seal
16 Protrusion
17 Slant
18 Step
19 Cassette seal
20 Cassette seal
21 Annular groove
22 Seal
23 Cassette seal
24 Cassette seal

What is claimed is:

1. A cassette seal comprising:
a first ring and a second ring having an L-shaped cross section, axial sections and radial sections of the first and second rings being aligned parallel to each other to form an inner chamber;
a sealing arrangement situated on the first ring engaging in the direction of the second ring, and a gap provided between the radial section of the first ring and the axial section of the second ring;
an encoder extending on the side of the axial section of the second ring facing away from the inner chamber, the encoder extending over the axial section of the second ring in the direction of the radial section of the first ring and in an extending area having a downward slant in the direction of the inner chamber, the downward slant having a radius decreasing toward the inner chamber, the slant forming the gap with the radial section of the first ring, and wherein the encoder has a maximum outer radius at the side of the axial section of the second ring facing away from the inner chamber.

2. The cassette seal as recited in claim 1 wherein the encoder has a ring design, the encoder being wider than the axial section of the second ring.

3. The cassette seal as recited in claim 1 wherein the slant of the encoder projects into the inner chamber.

4. The cassette seal as recited in claim 1 wherein the slant of the encoder ends with a side of the axial section of the second ring facing away from the inner chamber, the slant having an annular indentation near the axial section of the second ring.

5. The cassette seal as recited in claim 4 wherein the encoder has a twin-axis design in the extending area forming the annular indentation.

6. A wheel bearing arrangement of a motor vehicle, comprising the cassette seal as recited in claim 1.

7. A cassette seal comprising:
a first ring and a second ring having an L-shaped cross section, axial sections and radial sections of the first and second rings being aligned parallel to each other to form an inner chamber;
a sealing arrangement situated on the first ring engaging in the direction of the second ring, and a gap provided between the radial section of the first ring and the axial section of the second ring;
an encoder extending on the side of the axial section of the second ring facing away from the inner chamber, the encoder extending over the axial section of the second ring in the direction of the radial section of the first ring and in an extending area having a downward slant in the direction of the inner chamber, the downward slant having a radius decreasing toward the inner chamber, the slant forming the gap with the radial section of the first ring, and wherein the slant of the encoder begins axially outside the second ring and proceeds with the decreasing radius axially inside the second ring.

* * * * *